(12) United States Patent
Gaertner et al.

(10) Patent No.: US 8,996,842 B2
(45) Date of Patent: Mar. 31, 2015

(54) MEMORY STACKS MANAGEMENT

(75) Inventors: Mark Gaertner, Vadnais Heights, MN (US); Mark Alan Heath, Moore, OK (US)

(73) Assignee: Seagate Technology LLC, Cupertino, CA (US)

( * ) Notice: Subject to any disclaimer, the term of this patent is extended or adjusted under 35 U.S.C. 154(b) by 714 days.

(21) Appl. No.: 12/963,933

(22) Filed: Dec. 9, 2010

(65) Prior Publication Data

US 2012/0151179 A1    Jun. 14, 2012

(51) Int. Cl.
  *G06F 12/00* (2006.01)
  *G06F 12/02* (2006.01)
  *G06F 7/78* (2006.01)

(52) U.S. Cl.
  CPC ............ *G06F 12/0284* (2013.01); *G06F 7/785* (2013.01)
  USPC .................... 711/206; 711/202; 711/E12.059

(58) Field of Classification Search
  CPC .............................. G06F 7/785; G06F 12/0284
  USPC ...................... 711/202, 206, E12.59, E12.059
  See application file for complete search history.

(56) References Cited

U.S. PATENT DOCUMENTS

| | | | |
|---|---|---|---|
| 4,445,170 A * | 4/1984 | Hughes et al. | 711/2 |
| 4,928,239 A * | 5/1990 | Baum et al. | 711/136 |
| 6,745,288 B2 * | 6/2004 | Jacobs | 711/118 |
| 8,335,904 B1 * | 12/2012 | Kitchen et al. | 711/170 |
| 2007/0079054 A1 * | 4/2007 | Rudelic | 711/103 |
| 2010/0017578 A1 * | 1/2010 | Mansson et al. | 711/171 |
| 2014/0013056 A1 * | 1/2014 | O'Connor et al. | 711/122 |

* cited by examiner

*Primary Examiner* — Jared Rutz
*Assistant Examiner* — Mehdi Namazi
(74) *Attorney, Agent, or Firm* — HolzerIPLaw, PC

(57) ABSTRACT

A method for managing a memory stack provides mapping a part of the memory stack to a span of fast memory and a part of the memory stack to a span of slow memory, wherein the fast memory provides access speed substantially higher than the access speed provided by the slow memory.

18 Claims, 7 Drawing Sheets

MEMORY STACKS MANAGEMENT

DESCRIPTION OF THE RELATED ART

Most computing systems employ the concept of a "stack" to hold memory variables associated with one or more active subroutine or process threads (collectively referred to herein as "subroutine"). When a new subroutine is called, a stack related thereto grows in order to provide space for the temporary variables of such subroutines. When execution control is transferred from a first subroutine to a second subroutine, the registers used by the first subroutine are pushed onto the stack as well. Subsequently, after the second subroutine is done executing, the register contents may be restored. As subroutine calls nest within one another, the stack continues to grow, such that the temporary variables associated with the active portion subroutine are at the top of the stack. A system designer needs to ensure that enough memory space is available for a stack to grow to its worst-case size, which is associated with the deepest level of subroutine nesting that may occur in the system. On the other hand, growth of stacks to worst-case size may result in inefficient utilization of stack allocation space and may slow the performance of a computing system in cases where the computing system runs out of available stack allocation space.

SUMMARY

Implementations described and claimed herein provide for the managing of memory stacks across different physical memories. A method for managing a memory stack provides mapping a part of the memory stack to a span of fast memory and a part of the memory stack to a span of slow memory, wherein the fast memory provides access speed substantially higher than the access speed provided by the slow memory. In an implementation, the fast memory is tightly integrated with a processor. This Summary is provided to introduce a selection of concepts in a simplified form that are further described below in the Detailed Description. These and various other features and advantages will be apparent from a reading of the following detailed description. This Summary is not intended to identify key features or essential features of the claimed subject matter, nor is it intended to be used to limit the scope of the claimed subject matter.

BRIEF DESCRIPTION OF THE DRAWINGS

A further understanding of the various implementations described herein may be realized by reference to the figures, which are described in the remaining portion of the specification. In the figures, like reference numerals are used throughout several figures to refer to similar components.

DETAILED DESCRIPTION

Figure 1:
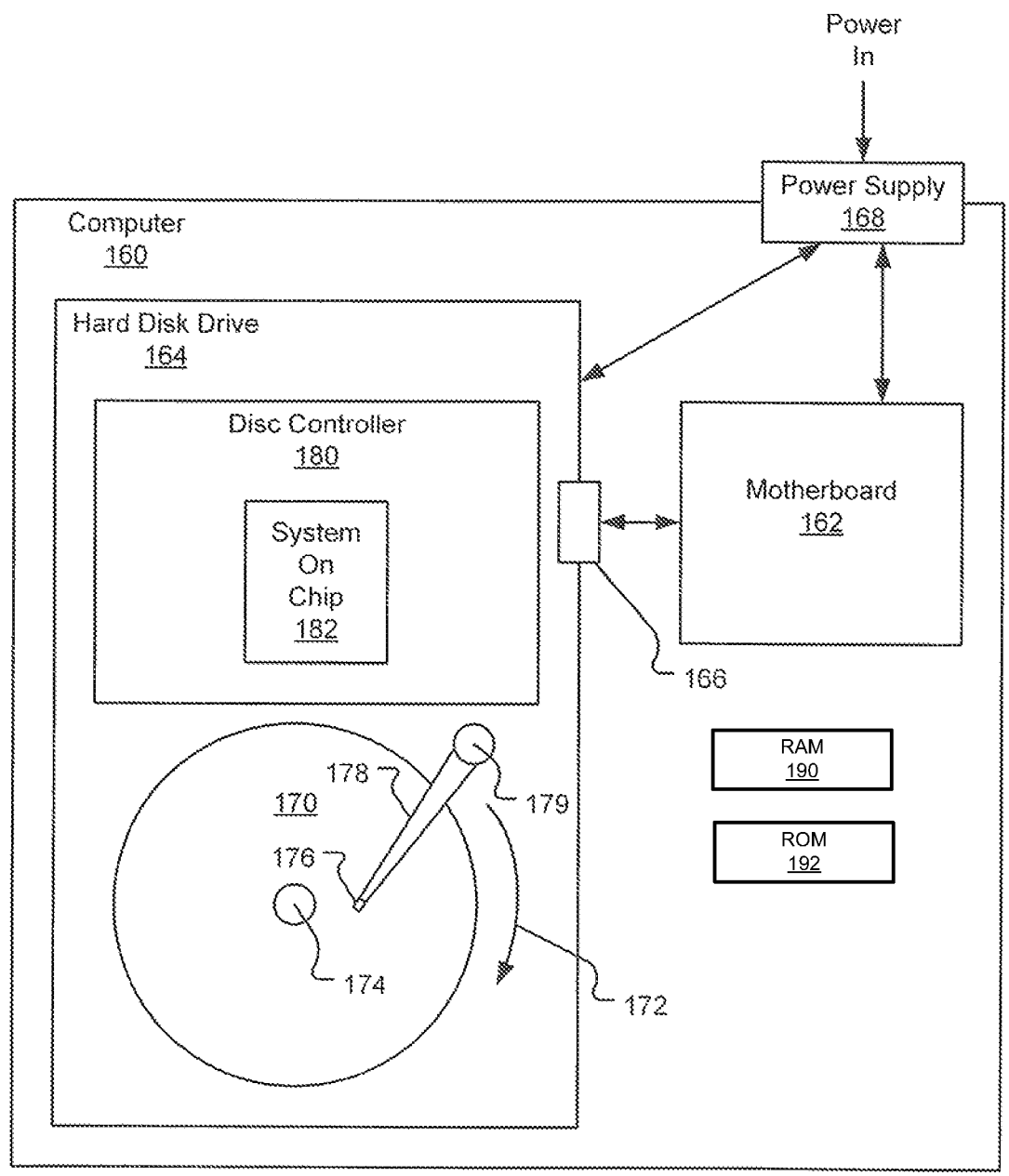
FIG. 1 illustrates an example computing system including a motherboard and a hard disc drive for implementing the implementations described herein.

FIG. 1 illustrates an example computing system 160 including a motherboard 162 and a hard disc drive (HDD) 164. The computing system 160 may be any server, desktop, laptop, or other computing system. The computing system 160, for example, operatively couples various system components (e.g., HDD 164) using at least the motherboard 162. In one implementation, the motherboard 162 and the HDD 164 are connected together via a Serial ATA interface 166, however, other connection schemes are contemplated. Through the motherboard 162, the computer controls operation of the HDD 164.

Both the motherboard 162 and the HDD 164 are powered by a power supply 168 that converts incoming AC power to DC power, step down an incoming voltage, step-up the incoming voltage, and/or limit current available to the motherboard 162 and the HDD 164. In one implementation, power for the HDD 164 comes from the power supply 168 through the motherboard 162.

The HDD 164 is equipped with a disc pack 170, which is mounted on a spindle motor (not shown). The disk pack 170 includes one or more individual disks, which rotate in a direction indicated by arrow 172 about a central axis 174. Each disk has an associated disc read/write head slider 176 for communication with the disk surface. The slider 176 is attached to one end of an actuator arm 178 that rotates about a pivot point 179 to position the slider 176 over a desired data track on a disk within the disk pack 170.

The HDD 164 is also equipped with a disc controller 180 that controls operation of the HDD 164. In one implementation, the disc controller 180 resides on a printed circuit board (PCB). The disc controller 180 may include a system-on-a-chip (SOC) 182 that combines some, many, or all functions of the PCB 180 on a single integrated circuit. Alternatively, the functions of the PCB 180 are spread out over a number of integrated circuits within one package (i.e., SIP). In an alternate implementation, the disc controller 180 includes controller firmware.

The computing system 160 also has internal memory such as random access memory (RAM) 190 and read only memory (ROM) 192. Furthermore, the motherboard 162 has various registers or other form of memory. Such memory residing on the motherboard 162 is accessible by one or more processors on the motherboard 162 at a higher speed compared to the speed at which such processors can generally access RAM 190, ROM 192, etc. Therefore, such memory residing on the motherboard 162 is referred to as the tightly integrated memory (TIM), also referred to sometime as a tightly coupled memory (TCM) or high speed memory. However, in alternate implementation the term TIM may also be used to refer to other memory module that is accessible by one or more processor in a high speed manner.

One or more of the memory modules, such as the RAM 190, the ROM 192, various TIM resident on the motherboard, and the memory provided by the HDD 164, are used to store one or more computer programs, such as the operating system, etc. Such computer programs use a number of functions, routines, subroutines, and other program structures to store instructions, wherein the instructions are processed using one or more processors of the computer. A subroutine may be called to process a number of instructions in an iterative manner and a computer program calling a subroutine generally provides a number of parameters to a called subroutine.

At any point during execution of a computer program a number of subroutines may be active and in various stages of processing. Any time a subroutine calls another subroutine, or passes control to another subroutine, the calling subroutine stores the present values of various temporary parameters in a memory until the control is passed back from the called subroutine to the calling subroutine.

In one implementation, the SOC 182 uses a stack to hold temporary variables associated with an active subroutine. In one implementation a number of subroutines related to a process thread shares a stack. In one implementation, an application that is written on one thread uses one stack. However, an application that is multi-threaded may use multiple stacks. Each time a new subroutine is called, the stack grows to provide enough space for the temporary variables of the new subroutine. Further, because subroutine calls "nest" within one another, the stack continues to grow with more subroutine calls. A stack is a last-in-first-out (LIFO) storage structure where new storage is allocated and de-allocated at one end, called the "top" of the stack.

Figure 2:
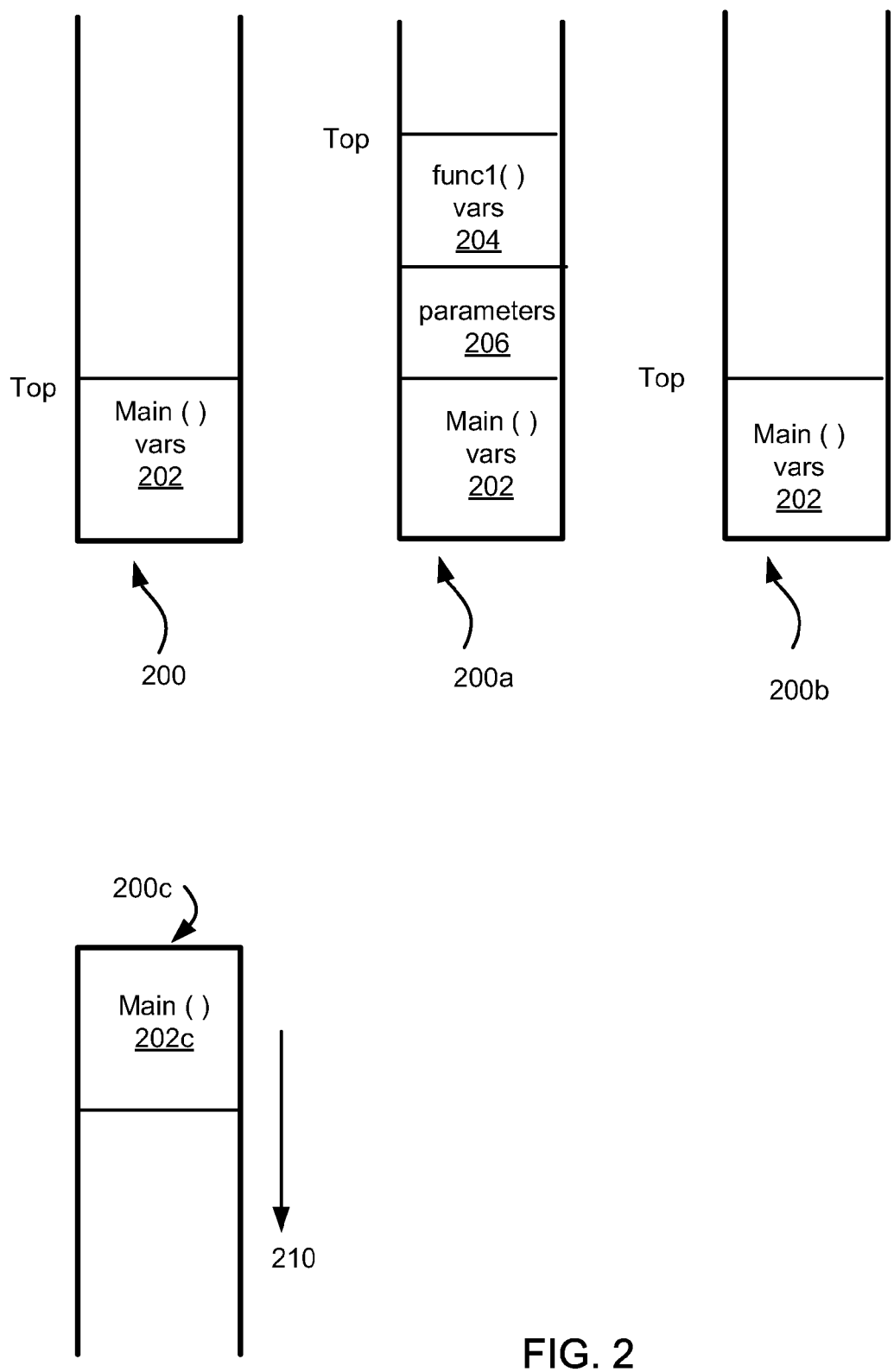
FIG. 2 illustrates an example mapping of a memory stack across different physical memories.

FIG. 2 illustrates an example of a stack 200. For example, when a program begins executing its main( ) function 202, space is allocated on the initial part of the stack for the variables declared within the main( ) function 202. If the main( ) function 202 calls a function func1( ) 204, additional storage is allocated for the variables in the func1( ) at the top of the stack 200 as shown by stack 200*a*. Note that at this point the parameters passed by main( ) function 202 are stored at the bottom of the stack 200. If the function func1( ) 204 were to call any additional functions, storage for such new function would be allocated at the top of the stack. When the function func1( ) 204 returns, storage for its local variables in de-allocated, and the top of the stack 200 returns to the position as shown by stack 200*b*. While FIG. 2 illustrates operation of a stack with respect to a function, stacks operate in similar manner with respect to routines, subroutines, etc. As seen in FIG. 2, the temporary variables associated with the active portion of the subroutine/function are located at the "top" of the stack.

In an alternate arrangement of stacks, stacks are designed in a memory space so as to grow downwards in a given address space. In such an example, the initial part of the stack is at the top of the stack. An example is a reverse stack 200*c* illustrated in FIG. 3. The reverse stack 200*c* grows towards lower memory addresses as shown by the arrow 210. Thus the space for the main( ) function 202 is allocated at top of the stack 202*c*. In such a reverse stack, the temporary variables associated with the active portion of the subroutine/function are located at the "bottom" of the reverse stack.

Computing systems generally allow for the stack to grow to the "worst-case" size of the stack. The "worst-case" size of the stack is associated with the deepest level of subroutine nesting that occurs in the system. Providing for sufficient tightly integrated memory (TIM) or high speed memory, such as data tightly-coupled memory (DTCM) to account for the "worst-case" size of the stack can be cost prohibitive. Further, multi-tasking computing systems have a different stack for each task (or thread) that is active. Providing for sufficient high speed memory, such as DTCM (used herein to refer to any high speed memory or tightly integrated memory) to account for the "worst-case" size of the each stack that is active can result in inefficient utilization of the DTCM.

Generally, stacks operate at or near empty condition. However, the nesting level increases significantly in error paths. As a result, stacks get substantially filled in error paths. This is especially true in controller firmware, where expensive DTCM is used to host stacks. Therefore, when a controller firmware enters an error path, expensive DTCM is used up to store the parameters resulting from the deep nesting resulting from controller firmware entering into an error path. Performance, however, is not crucial in error paths. Thus, providing for sufficient high speed memory, such as DTCM, to account for the "worst-case" size of error paths is unnecessary.

Figure 3:
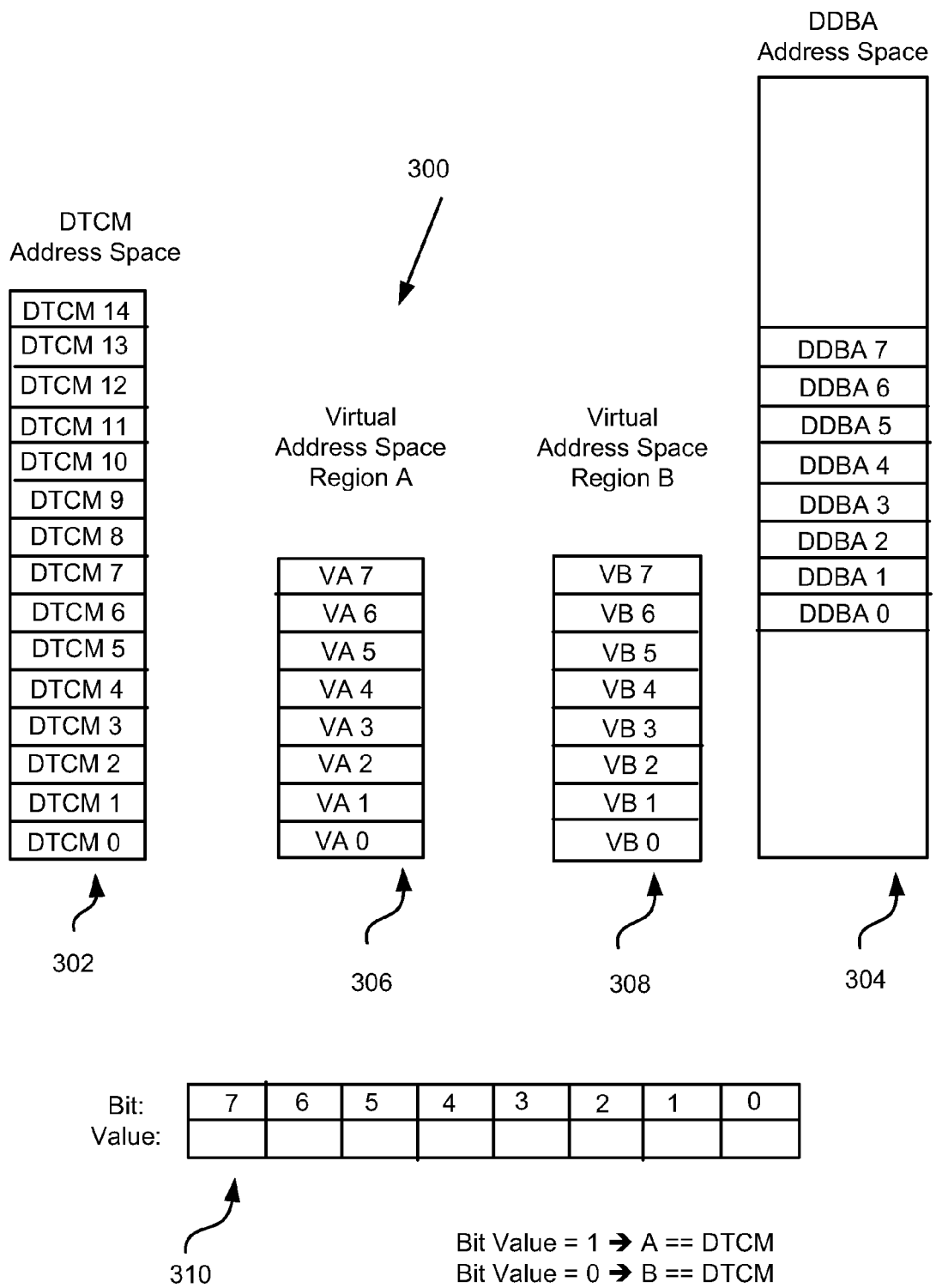
FIG. 3 illustrates an example system for allocation of memory stacks in virtual address regions.

FIG. 3 illustrates an example mapping 300 of stacks across different physical memories. The mapping 300 includes a DTCM addressable space 302 and a data direct buffer access (DDBA) addressable space 304. The term DDBA is used herein to specify any memory that is generally not tightly coupled and as such it provides slower access speed compared to tightly coupled memory such as the DTCM. Generally, DDBA or similar memory is cheaper in terms of cost compared to the DTCM. The DTCM addressable space 302 is divided into a number of addressable pages of equal size. These DTCM addressable pages are denoted as DTCM0, DTCM1 . . . DTCM14. In the illustrated mapping 300, it is assumed that the first eight pages of the DTCM memory, DTCM0 to DTCM7 are shown to be used as providing stack space. For example, if 8 KB of the addressable DTCM space 302 is used for providing stacks, it may be divided into eight pages, each of eight pages DTCM0 to DTCM7 will be of 1 KB. The DDBA addressable space 304 is also divided into a number of addressable pages of equal size, denoted as DDBA0, DDBA1 . . . DDBA7 with each of the DDBA page being the same size as the DTCM page. In one implementation of the mapping 300, the number of pages in the DDBA 304 is set to be equal to the number of pages in the DTCM 302 that are used for providing stacks.

FIG. 3 also includes a virtual address space region A 306 and a virtual address space region B 308. Each of the region A 306 and the region B 308 are also divided into a number of pages equal to the number of DTCM pages used for providing stacks. The size of the pages in the region A 306 and the region B 308 are the same as the size of the DTCM pages. Furthermore, FIG. 3 also shows a memory management unit (MMU) 310 that would allow applicable firmware to alias particular pages of the DTCM addressable space 302 into one of the two virtual address space regions 306 and 308. The number of bits in the MMU 310 is set to be equal to the number of pages in the DTCM addressable space 302 used for providing stacks. Therefore, in the example illustrated in FIG. 3, the MMU 310 has eight bits.

Each bit of the MMU 310 is assigned a value of zero (0) or one (1) depending upon whether a corresponding page in the DTCM is to be aliased to the virtual address space region A 306 or to the region B 308. The process of determining the values of each bit is described in further detail below. Note that because there are two virtual address space regions A 306 and B 308, if a separate MMU were to be used for the virtual address space B, the values of the bits in such an MMU for the virtual address space B would be complement to their values in the MMU 310. For example, if bit 7 had a value of 1 in MMU 310, corresponding bit 7 in the MMU for the virtual address space B would have a value of 0, and vice versa.

Figure 4:
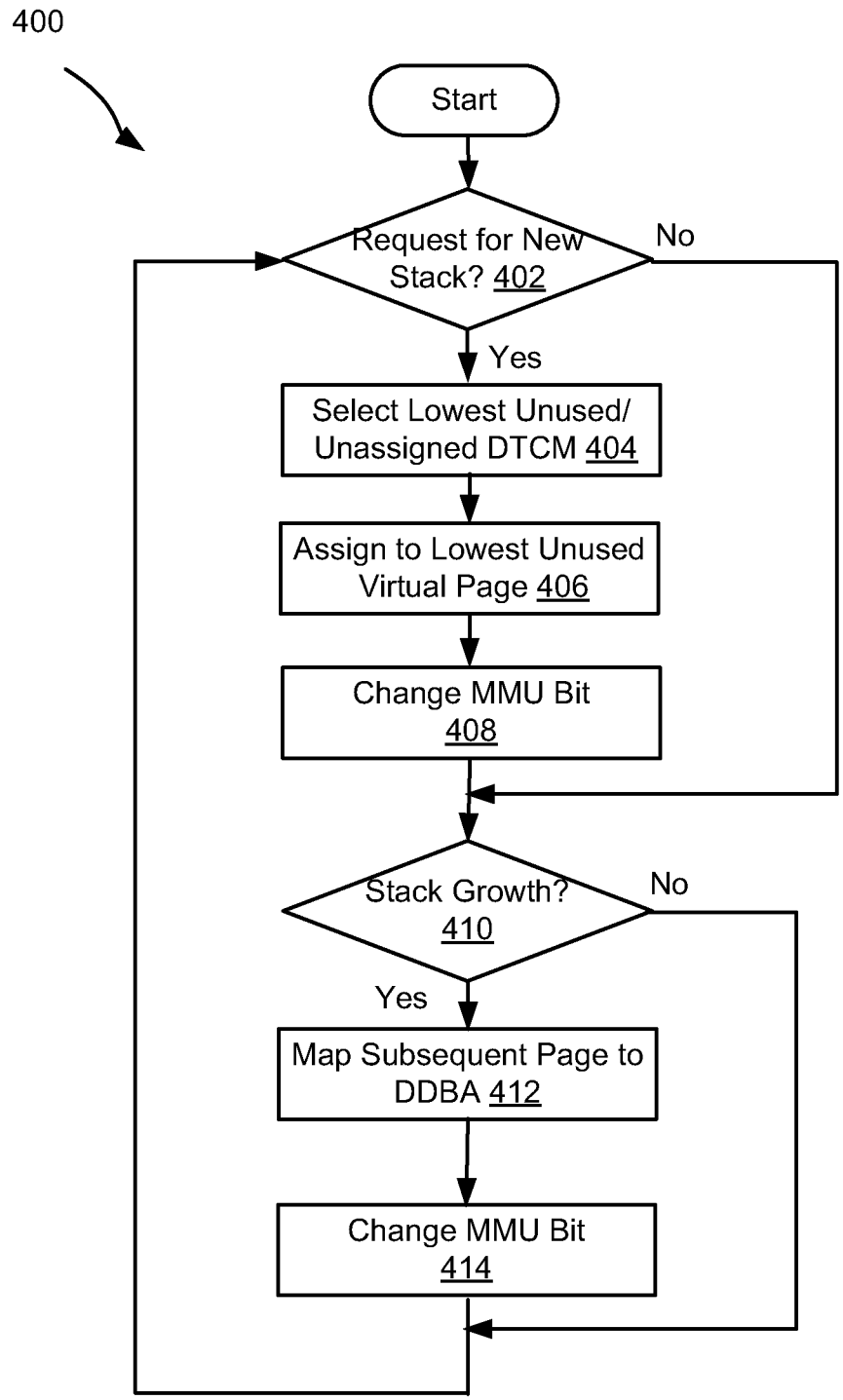
FIG. 4 illustrates an example method for assigning a virtual address space from one of the virtual address space region.

FIG. 4 illustrates a flowchart 400 of a process of assigning a virtual address space from one of the virtual address space region A 306 and the virtual address space region B 308 to a DTCM page. Generally, stacks are setup before starting execution of a program or a thread. In one implementation, the size of the stack is determined based on some logic that determines a stack size that is adapted for performance or functioning of the program. For example, in one implementation, an initialization logic determines that for a first stack 4K of high speed memory size is required so that first stack has 4K of high speed memory such as DTCM and after that the first stack spans low speed memory such as DDBA. In an alternate case, the initialization logic determines that for a second stack 4K of high speed memory size is required so that the second stack has 8K of high speed memory such as DTCM and after that the second stack spans low speed memory such as DDBA. At block 402 determines if there is any outstanding request for a new stack in the DTCM 302. If no request is outstanding, control passes further down to a block 410. If block 402 determines that there is a request for a new stack, control is transferred to a block 404. Block 404 selects the lowest unused and unassigned DTCM page for creating such a stack. Thus, for example, if there are no other stacks in the DTCM addressable space, block 404 selects DTCM0 page for creating the stack (referred to here as Stack 1).

Figure 5:
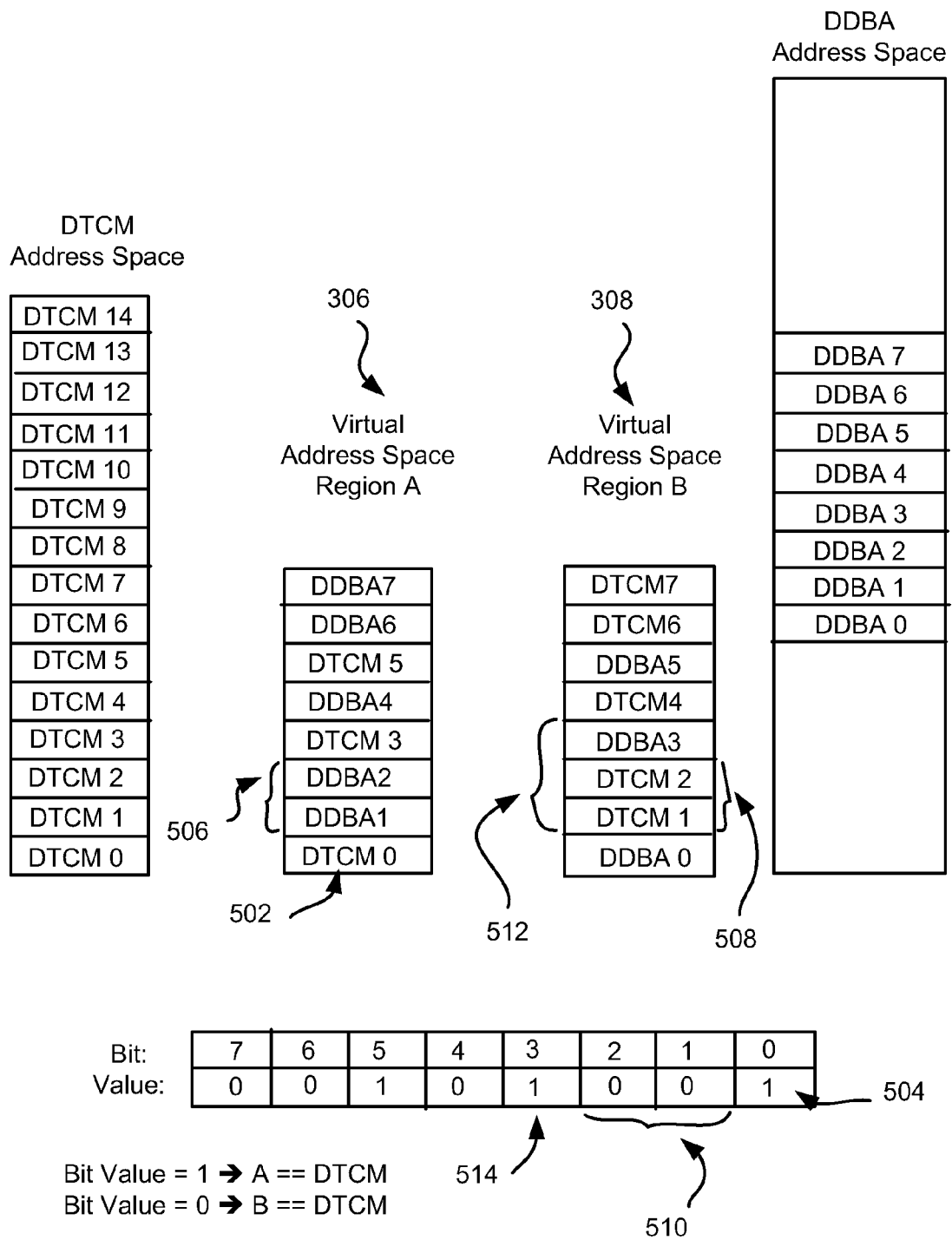
FIG. 5 illustrates an example of stack allocation to virtual address space according an implementation disclosed herein.

Subsequently, at block 406 the lowest unused virtual page of the virtual address space region A 306 is made addressable to the DTCM0. Thus, in the example disclosed herein, VA0 is made addressable to DTCM0. The mapping of VA0 to DTCM0 is shown in FIG. 5 at 502. If this was a very first stack, either of the virtual address space region A 306 or the virtual address space region B 308 is used to initiate such assignment of a virtual page to the DTCM. A block 408 changes the value of a bit corresponding to the DTCM0 page to 1, as shown in FIG. 5 at 504.

Subsequently, a block 410 determines if there is additional space required for any existing stack to grow. In the present case, with Stack 1 being open, block 410 determines is Stack 1, based in DTCM0 requires more memory. However, in an alternate situation, block 410 reviews more than one existing stacks to see if there is any growth in any of such stacks. Such additional space requirement is due to calls to new subroutines, functions, etc. Note that the size of DTCM0 may be sufficient to save variables/parameters for function/subroutine calls up to a certain level of nesting. However, if the stack grows larger, it may need more space than just that provided by the DTCM0 page. As discussed above, one example condition where this happens is in the case when one or more program enters into an error loop, in which case, it makes multiple calls to the same function/subroutine, causing the stack to grow.

In such a case, a block 412 maps the virtual page above the page which is mapped to the DTCM0, in this case VA1, to a page in the DDBA address space 304. As a result, the values and parameters related to the later called functions/subroutines are mapped to a cheaper/slower memory. Given that empirically, stacks do not grow beyond certain size, except in cases when a program has entered into an error loop, allowing stacks to grow in slower/cheaper memory such as DDBA memory 304 allows more stacks to be mapped to the expensive DTCM memory 302.

In the current case, for example, suppose that Stack 1 grows to require between two and three pages of memory. In this case, as shown in FIG. 5 at 506, VA1 and VA2 are both mapped to the DDBA memory space 304, specifically to DDBA1 and DDBA2, over next several iterations of the program 400. Because the virtual address space region B 308 is complementary to the virtual address space region A 306, as shown by 508 in FIG. 5, VB1 and VB2 will both be automatically mapped to DTCM, specifically to DTCM1 and DTCM2. Subsequently, block 414 changes the value of a bit corresponding to the DTCM1 and DTCM2 page to 0, as shown in FIG. 5 at 510.

If during a next iteration, block 402 determines that a second stack, Stack 2, needs to be opened, block 404 will select lowest unassigned DTCM space. In the present case, such as page is DTCM1. Note that DTCM1 is already mapped to the virtual address space region B 308 at VB1. Therefore, at block 406, Stack 2 will be assigned to DTCM1 and mapped to VB1. In this case, because the MMU bit related to the pages DTCM1 is already set at 0, block 408 does not need to change the MMU bit related to DTCM1.

Subsequently block 410 monitors for growth of both Stack 1 and Stack 2. If during any iteration, if Stack 2 grows, it is allowed to grow further in the virtual address space region B 308. At the same time, if there is growth in Stack 1, it is allowed to continue growing in the virtual address space region A 306. In the present example, suppose that over a number of iterations, Stack 2 grows to occupy more than two but less than three pages worth of memory. In this case, Stack 2 takes up three consecutive pages in the virtual address space region B 308, as shown by 512 in FIG. 5. During an iteration when block 406 determines that Stack 2 needs to grow beyond VB2 to VB3, it maps the VB3 to DDBA 304. This is due to the fact that the top part of the stack, when possible, should be allocated to slow memory. Because VB3 is mapped to DDBA 304, VA3, being complementary to VB3, will be mapped to the DTCM 302. Therefore, subsequently, block 408 will change the MMU corresponding to DTCM3 to 1, as shown by 514 in FIG. 5. Again this is consistent with the structure of the virtual address space region A 306 and the virtual address space region B 308 in that mapping of each page in these regions are complementary to each other.

The system disclosed in FIG. 3, with two virtual address space regions 306 and 308, allows two active stacks to be allocated at the same time. As such, if at any time block 402 determines that a third new stack, Stack 3, needs to be allocated, such a new stack will be allocated at the lowest unused and unassigned DTCM page. In the present case, as discussed above, due to the growth of Stack 1 and Stack 2, DTCM0 to DTCM2 are already used and assigned to one of the virtual address space region A 306 and the virtual address space region B 308. Therefore, block 404 will select DTCM3 to start Stack 3. Because in the previous iteration when VB3 was mapped to DDBA, VA3 was mapped to DTCM3, block 406 does not need to assign DTCM3 to VA3. Furthermore, because the MMU control bit related to DTCM3 is already set to 1, block 408 does not need to change the control bit.

Subsequently, Stack 3 is allowed to grow in the virtual address space region A 306 with any subsequent pages assigned to Stack 3 being mapped to DDBA 304. Note that once Stack 3 is initiated at DTCM3 and assigned to initiate at VA3, it would not be possible to allow further growth in Stack 1. To avoid this problem, in one implementation, the number of stacks supported by the implementation is two. Alternatively, Stack 1 is assigned non-contiguous pages of the virtual address space region A 306. Thus, if Stack 3 was initiated at DTCM3 and assigned to VA3, if there is a need for Stack 1 to grow, it is allowed to grow with the next available page of the virtual address space region A 306 providing further growth opportunity. In this case, VA4 may be used for further growth of Stack 1 or Stack 3, whichever needs additional pages. Furthermore, because these are additional pages towards the top of the stack, they would be, when possible, mapped to DDBA 304. However, in certain cases it is possible that the growth of Stack 2 has already caused the next available pages in the virtual address space region A 306 to be mapped to the DTCM 302.

Figure 6:
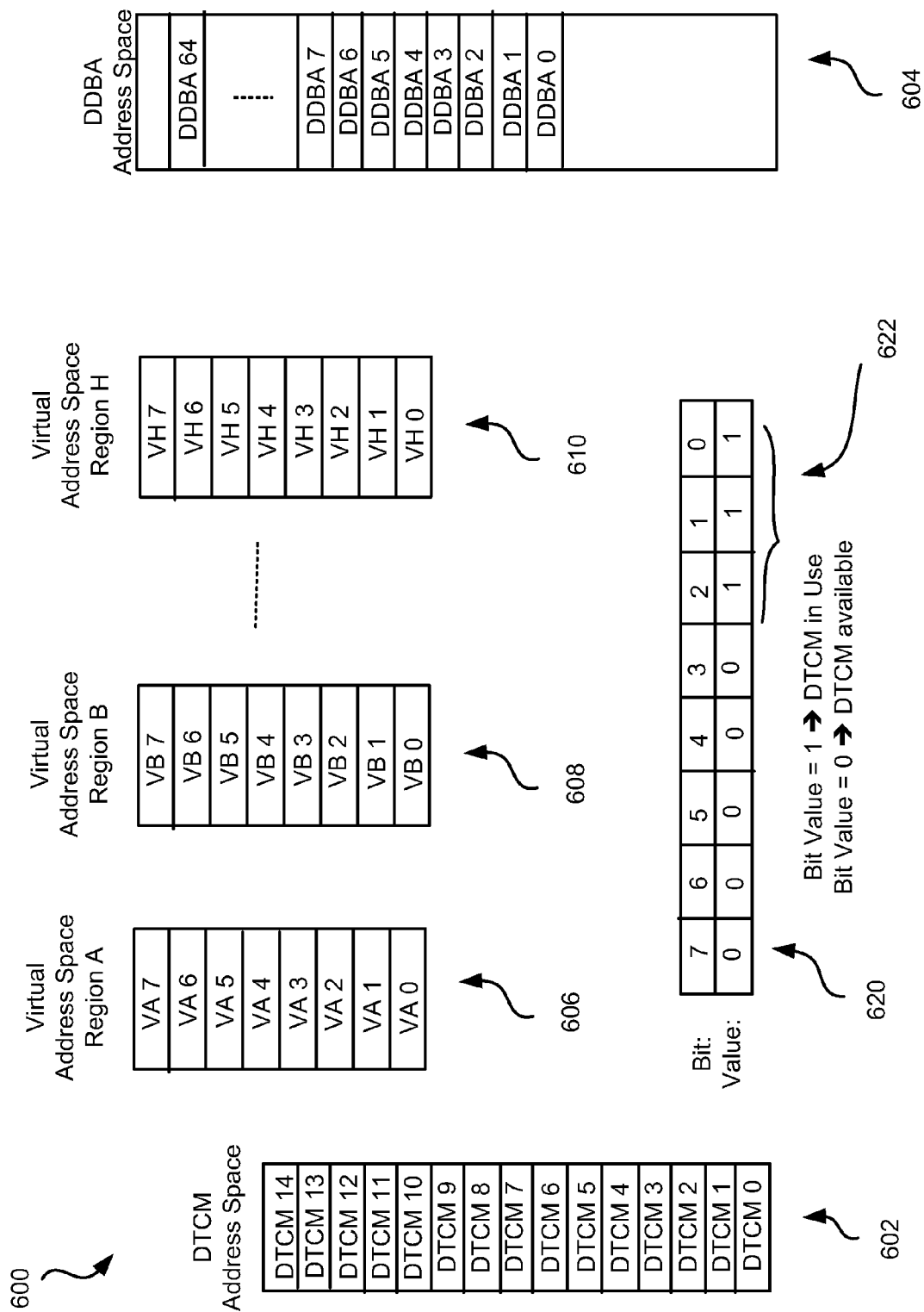
FIG. 6 illustrates an alternate implementation of stack allocation system.

While the above implementation provides two virtual address space regions, in an alternate implementation, more than two virtual address space regions are provided. FIG. 6 illustrates such an alternate implementation of a stack management system 600, with eight virtual address space regions.

Note that in the above implementation eight virtual address space regions, each virtual address space region corresponding to one pageable space of the DTCM address space 602 is provided. In an alternate implementation, any other number of virtual address space regions may also be provided. Specifically, the implementation of the stack management system 600 illustrated in FIG. 6 illustrates a DTCM address space 602 and a DDBA address space 604 that is used for supporting one or more stacks.

The stack management system 600 also includes eight virtual address space regions, namely virtual address space region A 606 to virtual address space region H 610 (not all virtual address space regions shown here). Because there are eight DTCM pages and eight virtual address space regions in this implementation, each DTCM page can be mapped to one of the eight virtual address space regions. Specifically, each of the DTCM pages that supports a stack is mapped to a bottom page of one of the eight virtual address space regions 606-610. For example, if at any given time, the first three DTCM pages DTCM0 to DTCM2 are used to support stacks, these three pages are mapped to VA0, VB0, and VC0, respectively.

The remaining pages of the virtual address space regions 606-610 are mapped to specific regions of the DDBA address space 604. For example, VA1 to VA7 are mapped to DDBA1 to DDBA7, whereas VB1 to VB7 are mapped to DDBA65 to DDBA71 (not shown herein).

In one example implementation, the allocation of a DTCM page is controlled by an MMU 620. Each bit of the MMU 620 designates whether the corresponding page of the DTCM address space 602 is used for supporting a stack or not. Thus, for example, before the allocation of stacks is initiated, each of the MMU control bits will be assigned a value of 0. In the example discussed above, if the first three DTCM pages DTCM0 to DTCM2 are used to support stacks, the MMU control bits for these three pages will be changes to 1, as shown by 622 in FIG. 6.

The stack management system 600 allows each addressable page of the DTCM address space 602 to be used to initiate a new stack and then allowing the stack to grow in one of the eight virtual address space regions 606 to 610. A method of allocating stacks to one of the various virtual address spaces is disclosed in further detail by a flowchart 700 illustrated in FIG. 7. Specifically, the flowchart 700 illustrates a method of allowing more than one stacks that are initiated in DTCM 602, or in a similar fast memory, to grow in the DDBA 604, or similar slow memory. Thus, the method provided by the flowchart 700 provides for an efficient allocation of DTCM 602 to the bottom (or initial) part of various stacks. Given the empirical evidence that generally stacks do not grow too large and that they grow to large size in case when a program enters an error loop, etc., such method allows optimizing use of expensive memory such as DTCM 602.

Figure 7:
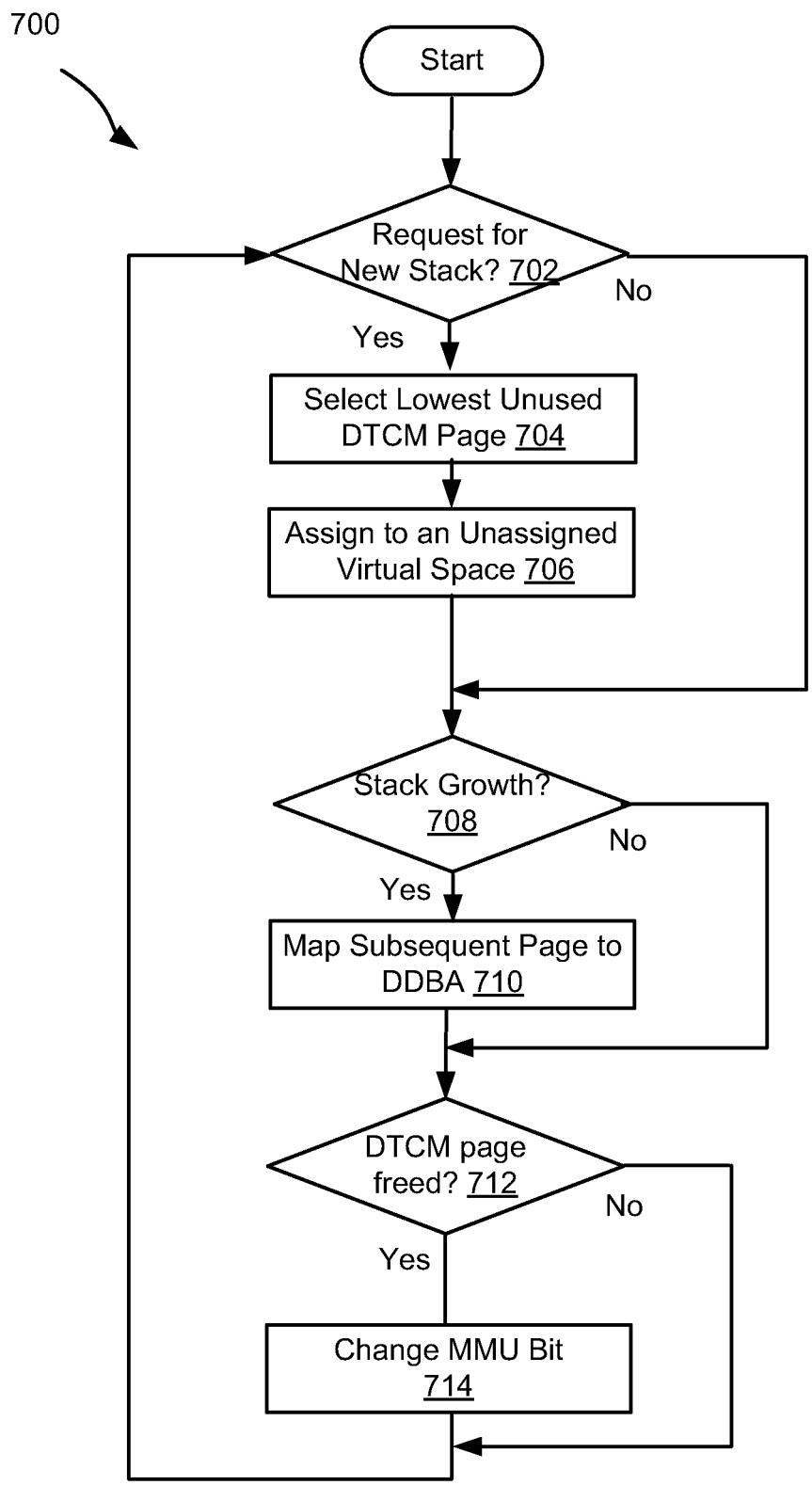
FIG. 7 illustrates an alternate method of allocating stacks to one of the various virtual address spaces.

Now referring to FIG. 7, it is assumed that the first eight pages of the DTCM address space 602 are used for providing stacks. However, in an alternate implementation, a larger or smaller number of pages are used to allocate stacks. The flowchart 700 provides for continuous monitoring of whether a new stack needs to be allocated or not, whether there is a request for growth in one of the existing stacks, and whether one or more previously allocated stack has been released.

Specifically, a block 702 determines if a new stack needs to be allocated. If a new stack needs to be allocated, a block 704 selects the lowest unused DTCM page to initiate the requested stack. The block 704 also changes the value of an MMU bit related to that particular DTCM page to 1 to indicate that the particular DTCM page is being used to support a stack. Subsequently a block 706 assigns the new stack to one of the unused virtual address space region A 606—virtual address space region H 610. In an implementation of stack management system 600 wherein the number of addressable pages in the DTCM 602 is same as the number of virtual address space regions (in this implementation, each is equal to eight), an MMU control unit is not provided for each of the virtual address space regions. Specifically, in such an implementation, each of the virtual address space regions 606-610 will have its lowest addressable page, namely VA0, VB0, . . . VH0 mapped to the DTCM address space 602 whereas each of the higher addressable pages, VA1-VA7, . . . VH1-VH7, mapped to the DDBA address space 604.

After assigning one of the virtual address space regions to a stack, a block 708 monitors growth in that stack. Upon detecting growth in a given stack, block 710 maps subsequent pages of the virtual address space that is mapped to the given stack to the DDBA address space 604. Note that in the present case, because each DTCM page of the DTCM address space 602 is mapped to the bottom page of the virtual address space regions A 606-H 610, respectively and as necessary, there is no need for using an MMU bit in a manner described above in FIG. 3, where two virtual address space regions were used.

However, in the system illustrated by FIGS. 6 and 7, the MMU 620 is used to indicate whether a given DTCM page is in use or not. For example, often during the operation of a program, a subroutines called from a program is completed and in such a case, there is no need to keep the stack that was generated as a result of call to that subroutine. In such a case, a DTCM page that was used to initiate a stack upon call to that particular subroutine becomes available for generating future stacks.

A block 712 determines if any DTCM page that was earlier assigned a stack has become available. If so, a block 714 changes an MMU bit related to that DTCM page to 0. However, if it is determined that no new DTCM pages have become available, no change to any MMU bit is made. Even though in the implementation described herein, the program 700 provides the appropriate monitoring of DTCM pages being used for stack allocation, in an alternate implementation, a microprocessor or other unit that is responsible for allocating stacks monitors and changes MMU bits as necessary.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing the method and system described herein. Accordingly, the logical operations making up the implementations described herein are referred to variously as operations, blocks, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application—and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method for managing a memory stack, the method comprising:
    mapping a first part of the memory stack to a span of fast memory and a second part of the memory stack to a span of slow memory, wherein the fast memory provides access speed substantially higher than the access speed provided by the slow memory;
    dividing the span of fast memory address space into a first number of pages;
    providing a number of control bits equal to the first number of pages, wherein each control bit represents the availability status of a corresponding fast memory page; and
    changing value of one of the control bits to an unavailable status upon mapping the first part of a memory stack to a lowest unused virtual page.

2. The method of claim 1, wherein the fast memory is tightly integrated with a processor.

3. The method of claim 1, wherein the slow memory is not tightly integrated with a processor.

4. The method of claim 1, wherein if the memory stack is an upward growing stack, mapping a bottom part of the memory stack to the fast memory.

5. The method of claim 4, wherein mapping the memory stack further comprises:
    providing a first virtual address space and a second virtual address space;
    dividing each of the span of the fast memory, the span of the slow memory, the first virtual address space, and the second virtual address space into a pre-determined number of equal sized pages;
    mapping a first page of the first virtual address space to a first page of the fast memory; and
    mapping the bottom part of the memory stack to the first page of the first virtual address space.

6. The method of claim 5, further comprising, mapping a corresponding first page of the second virtual address space to a page of the slow memory.

7. The method of claim 6, further comprising:
    if the size of the memory stack is larger than the size of a page of the fast memory:
        mapping a second page of the first virtual address space above the first page to the slow memory, and
        mapping an incremental part of the memory stack to the second page of the first virtual address space.

8. The method of claim 6, further comprising:
    providing a memory management unit, the memory management unit having a plurality of bits, each of the plurality of bits identifying mapping of a page of the first virtual address space.

9. The method of claim 1, wherein if the memory stack is a downward growing stack, the part of the stack mapped to the fast memory is a top part of the memory stack.

10. A method comprising:
    mapping a first part of a memory stack to a span of a tightly integrated memory TIM address space;
    mapping a second part of the memory stack to a span of non-TIM memory address space;
    dividing the span of TIM address space into a first number of pages;
    providing a control unit comprising a number of control bits equal to the first number of pages, wherein each control bit represents the availability status of a corresponding TIM page; and
    changing value of one of the control bits to an unavailable status upon mapping the first part of a memory stack to a bottom page of the one of a first number of virtual address spaces corresponding to the one of the control bits.

11. The method of claim 10, wherein the first part of the memory stack is an initial part of the memory stack.

12. The method of claim 11, further comprising:
    providing a first number of virtual address spaces;
    dividing each of the virtual address spaces into a second number of pages, wherein the size of each of the second number of pages is equal to the size of the first number of pages;
    mapping a bottom page of one of the first number of virtual address spaces to a TIM page; and
    mapping the initial part of a memory stack to the bottom page of the one of the first number of virtual address spaces.

13. The method of claim 12, further comprising:
    mapping a page above the bottom page of the one of the first number of virtual address spaces to a slow memory page; and
    mapping a part of the memory stack above the initial part of the memory stack to the page above the bottom page.

14. The method of claim 13, further comprising:
    mapping each page of the virtual address spaces other than the bottom page to a slow memory.

15. The method of claim 10, further comprising:
    determining when a stack mapped to a TIM page corresponding to the one of the control bits is not in use; and
    changing the value of the one of the control bits to an available status.

16. One or more non-transitory machine-readabe storage medium encoding computer-executable instructions for executing on a computer system a computer process, the computer process comprising:
    mapping a first part of a memory stack to span a fast memory and a second part of the memory stack to span a slow memory, wherein the fast memory provides access speed substantially higher than the access speed provided by the slow memory;
    dividing the span of fast memory, address space into a first number of pages;
    providing a number of control bits equal to the first number of pages, wherein each control bit represents the availability status of a corresponding fast memory page; and
    changing value of one of the control bits to an unavailable status upon mapping the first part of a memory stack to a lowest unused virtual page.

17. The one or more non-transitory machine-readable storage medium of claim 16, wherein the fast memory is tightly integrated with a processor.

18. The one or more non-transitory machine-readable storage medium of claim 16, wherein the part of a memory stack mapped to span a fast memory is an initial part of the memory stack.

* * * * *